United States Patent
Manaka

[11] 3,868,409
[45] Feb. 25, 1975

[54] ACRYLIC ACID ESTERS

[75] Inventor: Kazuo Manaka, Broadview, Ill.

[73] Assignee: Broadview Chemical Corporation, Broadview, Ill.

[22] Filed: Sept. 24, 1969

[21] Appl. No.: 860,786

[52] U.S. Cl.... 260/486 R, 117/124 E, 117/161 UZ, 260/57 A, 260/89.5, 260/465.4
[51] Int. Cl............................................. C07c 69/54
[58] Field of Search .................................. 260/486 R

[56] References Cited
UNITED STATES PATENTS
2,458,422  1/1949  Reynolds et al. ............... 260/486 R
3,417,567  12/1968  Higashimura...................... 260/41 A Primary Examiner—Lorraine A. Weinberger
Assistant Examiner—Paul J. Killos

[57] ABSTRACT

Monomeric compositions which are the reaction product of a monoamine or a polyamine having from two to four amino nitrogen atoms. Such reaction products may be characterized by the following general formula:

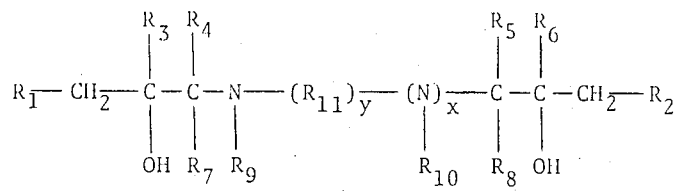

wherein $x$ is an integer from 0 to 3; $y$ is an integer from 0 to $x$; $R_1$ and $R_2$ are selected from the group consisting of acryloyloxy and methacryloyloxy; $R_3$, $R_4$, $R_5$, $R_6$, $R_7$, and $R_8$ are selected from the group consisting of hydrogen and lower alkyl; $R_9$ and $R_{10}$ are selected from the group consisting of hydrogen, lower alkyl, lower hydroxyalkyl, lower hydroxyalkyl acryloyloxy, and lower hydroxyalkyl methacryloyloxy; and $R_{11}$ is a lower alkylene group linking two nitrogen atoms.

3 Claims, No Drawings

ACRYLIC ACID ESTERS

The present invention relates to a novel composition of matter, and more specifically to a novel monomeric composition and to the polymers prepared therefrom.

Generally, the monomer of the present invention may be characterized as the reaction product of an unsaturated epoxy compound and a monoamine or a polyamine having from two to four amino nitrogen atoms. Such reaction products may be characterized by the following general formula:

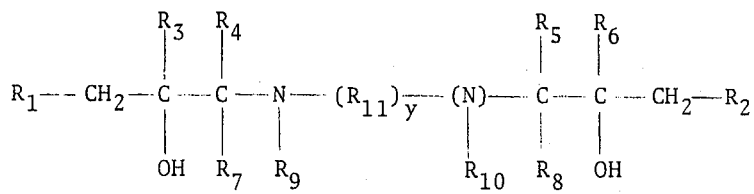

wherein $x$ is an integer from 0 to 3; $y$ is an integer from 0 to $x$; $R_1$ and $R_2$ are selected from the group consisting of acryloyloxy and methacryloyloxy; $R_3$, $R_4$, $R_5$, $R_6$, $R_7$ and $R_8$ are selected from the group consisting of hydrogen and lower alkyl; $R_9$ and $R_{10}$ are selected from the group consisting of hydrogen, lower alkyl, lower hydroxyalkyl, lower hydroxyalkyl acryloyloxy, and lower hydroxyalkyl methacryloyloxy; and $R_{11}$ is a lower alkylene group linking two nitrogen atoms.

In the preferred embodiment, $R_1$ and $R_2$ will have terminal unsaturation, i.e., a double bond adjacent to the end carbon atoms on the molecule.

A particularly preferred composition in accordance with the present invention is the reaction product obtained by reacting glycidyl acrylate and/or lower alkyl acrylates with monoamines and polyamines. For example, when a lower alkyl or hydroxyalkyl monoamine is employed, a product of the following structure is obtained:

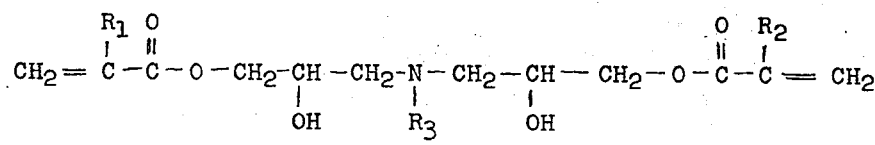

wherein $R_1$ and $R_2$ are selected from the group consisting of hydrogen and lower alkyl, and $R_3$ is selected from the group consisting of lower alkyl, lower hydroxyalkyl, cyano, and lower cyanoalkyl.

In a particularly preferred embodiment, glycidyl methacrylate is reacted with isopropyl amine, so that $R_1$ and $R_2$ are methyl, and $R_3$ is isopropyl. If it is desired to enhance the water solubility of the product, an alkanolamine may be employed, so that $R_3$ is a hydroxyalkyl group.

Particularly preferred diamine and polyamine derivatives are prepared in accordance with the present invention by reacting glycidyl acrylate and/or lower alkyl acrylate with a suitable diamine or polyamine, to obtain a product having the following general formula:

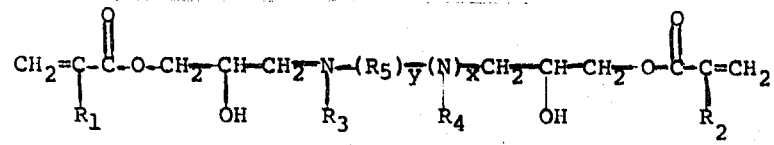

wherein $R_1$ and $R_2$ are hydrogen or lower alkyl, $R_3$ and $R_4$ are selected from the group consisting of hydrogen, alkyl, hydroxyalkyl, cyano, lower cyanoalkyl, and radicals of the formula

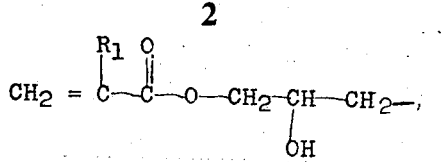

$R_5$ is a lower alkylene group as hereinbefore described, $x$ is an integer from 1 to 3, and $y$ is an integer from 0 to $x$.

The present invention also relates to the amine salts that may be prepared by reacting the monomers of the present invention with an acid.

As a result of the unsaturation that is present, the compositions of matter in accordance with the present invention have great utility as monomers. The functionality of the monomers is enhanced by employing a polyamine (i.e., where $x$ is 1 or more). Because of its polar character, the compositions of the present invention are also useful as surface active agents and as antistatic agents.

The present invention also relates to polymers prepared by reacting the foregoing monomers with suitable curing agents such as hydrogen peroxide or an organic peroxide or hydroperoxide. In a particularly preferred embodiment of the present invention, an acidic organic peroxide is employed as the curing agent.

An advantage of the monomers of the present invention is the presence of hydroxyl groups along the monomer molecule. These hydroxyl groups contribute a polar character to the monomer, producing a high bond strength when polymers made therefrom are used in the bonding of metals. This bond strength is still further increased when the nitrogen atom has a hydroxyalkyl, cyano, or cyanoalkyl group bonded thereto.

Polymerization of the monomers of the present invention may be inhibited with conventional polymerization inhibitors, such as hydroquinone, substituted hydroquinones, p-carboxyphenol, and the like. A particular advantage of the present invention is that many compositions that ordinarily act as polymerization inhibitors actually accelerate polymerization under acid conditions in the presence of an organic peroxide or hydroperoxide.

Particularly stable compositions may be prepared in accordance with the present invention by combining the monomers with other monomers and polymers, such as a novolak (phenolformaldehyde) resin. Such monomers not only have great shelf stability, but also may be set up to form polymers of exceptionally high strength.

Examples of suitable unsaturated epoxy compounds that may be reacted with amines to prepare the monomers of the present invention are as follows:

glycidyl acrylate 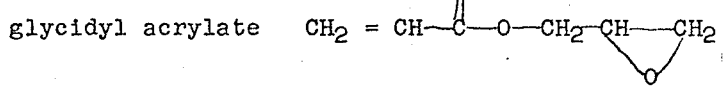

glycidyl methacrylate 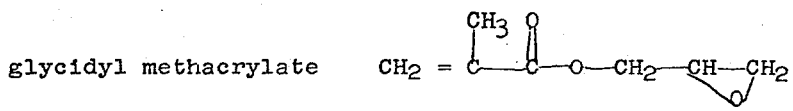

allyl glycidyl maleate

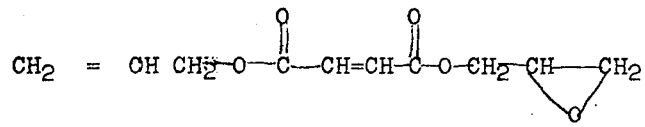

allyl glycidyl phthalate

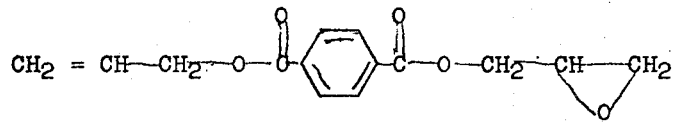

allyl-2,3-epoxybutyrate

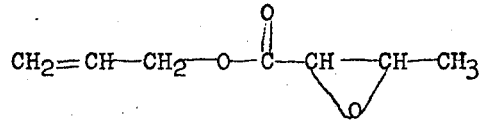

butadiene monoxide 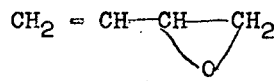

Suitable monoamines and polyamines for use in accordance with the present invention are as follows:

methylamine 

ethylamine 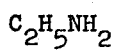

isopropylamine 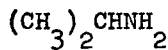

2-aminoethanol 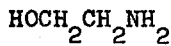

aniline 

hydrazine 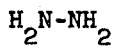

phenylhydrazine 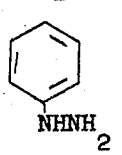

bisphenylhydrazine 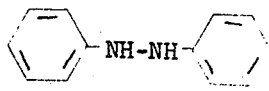

ethylene diamine 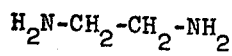

diethylene triamine 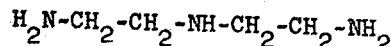

menthane diamine 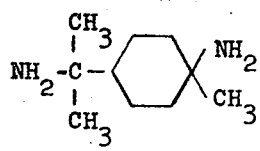

m-phenylene diamine 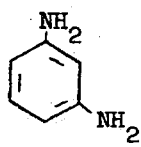

triethylene tetramine 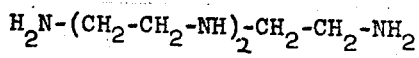

4,4'-diaminodiphenylmethane 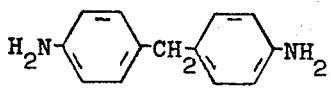

4,4'-diaminodiphenylsulfone 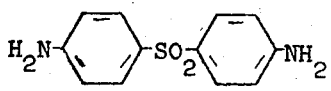

cyanamide 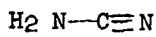

dicyandiamide 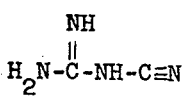

aminomethyl cyanide 

aminoethyl cyanide 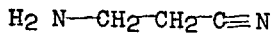

N-aminoethylpiperazine 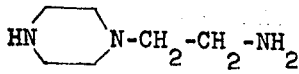

As those skilled in the art will realize, the number of unsaturated epoxy compounds and amines that may be used in accordance with the present invention is virtually unlimited.

When an amine is reacted with an unsaturated epoxy compound in accordance with the present invention, the epoxy ring is broken, producing a di-unsaturated or poly-unsaturated amine monomer. The reaction may be illustrated as follows, between glycidyl methacrylate and isopropyl amine:

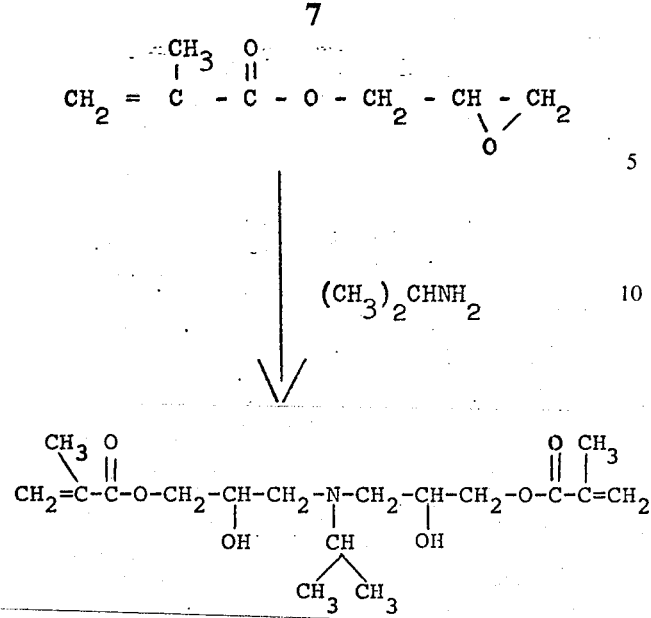

In the most preferred embodiment of the present invention, the amino monomers are further reacted with an acid, preferably an unsaturated organic acid, in order to produce the amine salt. It has been found that the monomers of the present invention have particularly advantageous properties under acid conditions. The use of an unsaturated acid also has the advantage of introducing further unsaturation into the monomer. A particularly suitable acid for preparing amine salts of the monomers in accordance with the present invention are acrylic and methacrylic acids.

When polyamines are substituted for monoamines in accordance with the present invention, compounds having a high degree of functionality are produced, since each nitrogen atom may react with up to two unsaturated epoxy compounds. For example, if glycidyl methacrylate is reacted with ethylene diamine, the following compound is produced:

It can be seen that this monomer has four carbon-carbon double bonds, and thus is capable of a high degree of cross-linking when polymerized.

As the reaction is exothermic, the monomers of the present invention are produced by simply mixing the appropriate amine and unsaturated epoxy compound. The amine salts are similarly prepared by an exothermic reaction.

As previously mentioned, when the amine salt derivatives of the present invention are combined with hydroperoxide or peroxide curing agents under acidic conditions, it has been found that hydroquinone and its derivatives actually act as curing accelerators, rather than an inhibitor, as would normally be expected. Alkyl hydroquinones are more active in this respect than unsubstituted hydroquinones, the amount of acceleration being proportional to the size and number of substituent groups. For example, the following hydroquinones have been arranged in increasing order of curing speed.

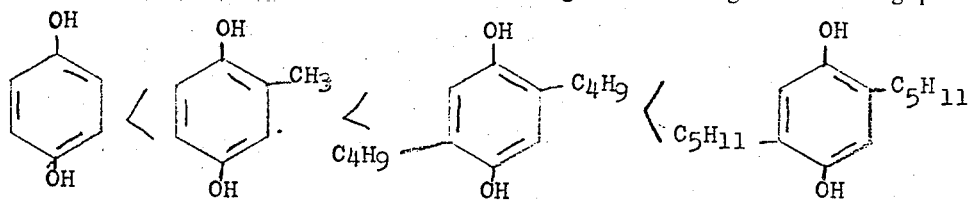

Thus, hydroquinones may be employed as a component of the monomer to extend shelf life, while at the same time serving as a polymerization promoter when the monomer is mixed with a curing agent.

Conventional amine promoters may also be used in conjunction with the present invention. These are especially useful under basic conditions, e.g., when the amine salt of the monomer is not being used, since hydroquinone and its derivates do not function as accelerators under basic conditions. Exemplary amine accelerators include N,N'-dimethylaniline, phenylhydrazine, N-aminorhodanine, t-butyl carbazate, cyanoguanidine, oxalyhydrazide, carbohydrazide, 1-

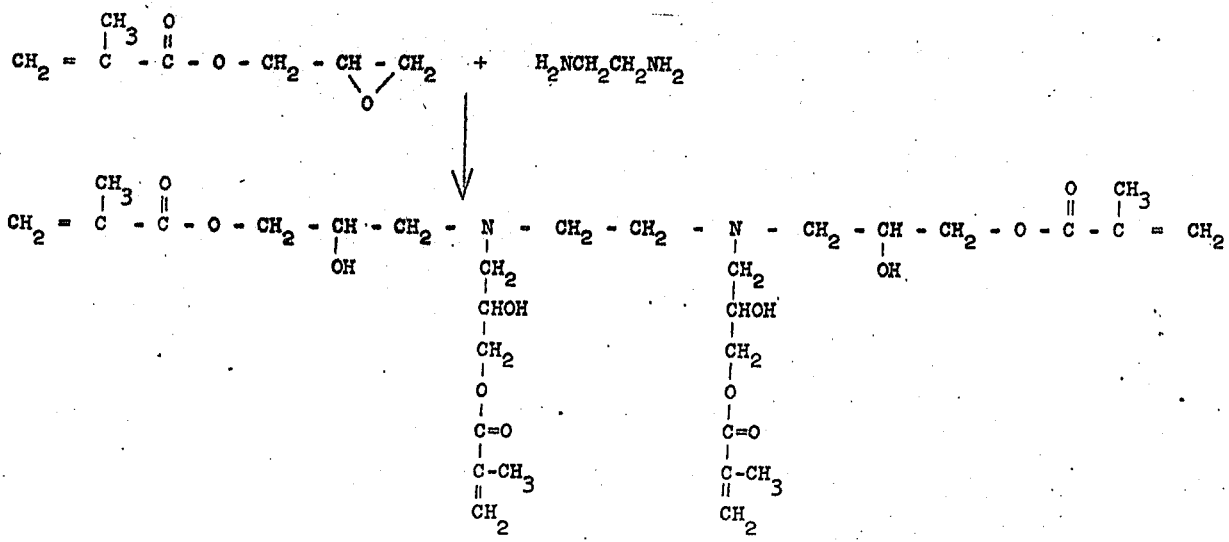

phenylsemicarbazide, methylhydrazine, and benzhydrazide.

The choice between an acidic or basic monomer is dictated primarily by the surfaces that it is desired to bond. For example, metals generally have a greater affinity for acidic monomers, while ceramic materials have a greater affinity for basic monomers.

The following examples are intended to illustrate the present invention, and should not be construed as limitative, the scope of the invention being determined by the appended claims.

EXAMPLE 1

20 moles of glycidyl methacrylate were placed into a 3-necked flask equipped with a thermometer, stirrer, and separatory funnel. 10 moles of isopropyl amine were placed in the separatory funnel. Isopropyl amine was fed into the flask over a period of 1 hour, while the contents of the flask were maintained below 30°C by constant stirring and by dipping the flask into cold water. After all of the isopropyl amine was added, stirring was continued for 7 hours while the temperature was maintained below 30°C. At the end of this interval, the contents of the flask were transferred to a second flask, where they were maintained for nine days at room temperature, in order to complete the reaction.

EXAMPLE 2

The procedure of Example 1 was repeated, except that glycidyl acrylate is substituted for the glycidyl methacrylate. The reaction conditions and appearance of the product were also the same as in Example 1.

EXAMPLE 3

Example 1 was repeated, except that ethanolamine was substituted for isopropyl amine. The reaction in this instance was somewhat faster, and heat was evolved much more rapidly. The product was also more soluble in water than those of the previous examples, probably as a result of the presence of three hydroxyl groups along the molecule.

EXAMPLE 4

Example 1 was repeated, except that 30 moles of glycidyl methacrylate were used, and ethylene diamine was substituted for the isopropyl amine. In this instance, a tri-functional monomer, having the following structure, is produced.

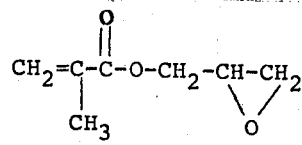

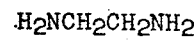

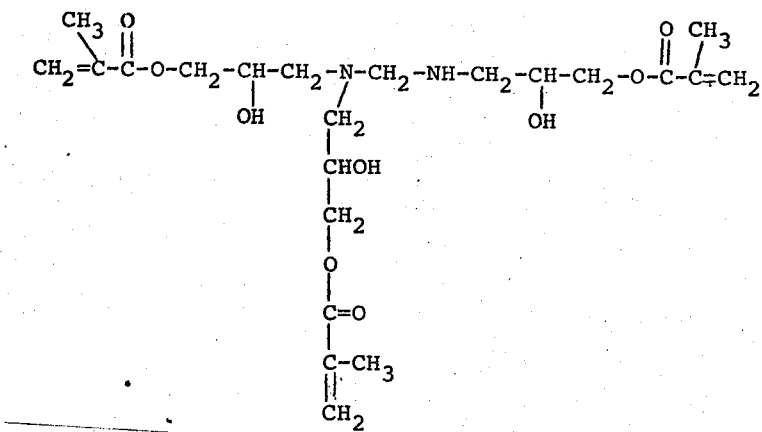

EXAMPLE 5

Example 1 was repeated, except that cyanamide was substituted for the isopropyl amine. Because of the cyanide group, the monomer product has a high degree of polarity.

EXAMPLE 6

Forty moles of glycidyl methacrylate were reacted with ten moles of triethylene tetramine in the same manner as described in Example 1. A tetrafunctional monomer was produced, wherein each of the amino nitrogen atoms reacted with a glycidyl methacrylate molecule.

EXAMPLE 7

A novolak resin was prepared by reacting phenol with formaldehyde in the presence of a small amount of hydrochloric acid catalyst. 143 grams of this resin were dissolved in 20 moles of glycidyl methacrylate. Ten moles of isopropyl amine were added to this solution as in Example 1. The compound obtained was extremely stable because of the presence of the novolak resin, and could be kept for a long period of time without polymerization.

EXAMPLE 8

The monomer made in accordance with Example 1 was found to have a viscosity of about 650 centipoises. One mole of this monomer was reacted with one mole of methacrylic acid, and agitated, producing the amine salt, as evidenced by the evolution of heat of neutralization. After about 1 hour, the temperature returned to room temperature. After standing for about 3 days, it was found that the viscosity had increased to about 4,000 centipoises. Further experiments showed that the viscosity of this amine salt varies with the amount of methacrylic acid employed, maximum viscosity being achieved when equimolar amounts of amine and acid are employed.

EXAMPLE 9

49.5 grams of the monomer prepared in Example 1 were mixed with 49.5 grams of methacrylic acid, to form the amine salt. After the salt had cooled, one gram of di-tert-amylhydroquinone was added and dissolved. The hydroquinone derivative acts as an inhibitor to polymerization in this system, as shown by its stability during heating at 120°F. for 10 days.

In a second container, 4 grams of t-butyl peroxymaleic acid were dissolved in a solvent consisting of 88 grams of methylene chloride and 8 grams of acetone.

A steel bolt was coated with this second solution, and the solvent were allowed to evaporate, leaving the t-butyl peroxymaleic acid behind. Then, the first component, containing the monomer, was coated onto the threads, and a bolt was screwed into position. The nut and bolt were "finger tight," meaning that they could not be unscrewed with the fingers, after about 3 minutes. After 24 hours, the torque of the bonded nut and bolt was tested according to specification Mil—S–22473C, and found to be 35 foot-pounds. In additional tests, it was found that the torque was so great that the bolt was broken before the nut could be unscrewed.

The polymer was further tested according to the pin-and-collar test as set forth in specifications Mil—R–46082 (MR). The results showed that curing was complete after three hours, and that a static shear strength of about 5,500 psi was produced.

EXAMPLE 10

Example 9 was repeated, except that one gram of di-tert-butylhydroquinone was substituted for the di-tert-amylhydroquinone. The results were almost identical, except that the curing speed of the polymer was slightly slower.

EXAMPLE 11

Example 9 was repeated, except that the monomer prepared in Example 3 was substituted for the monomer prepared in Example 1. The results were similar to those obtained in Example 1.

EXAMPLE 12

Example 9 was repeated, except that t-butylhydroperoxide was substituted for the t-butyl peroxymaleic acid. Comparable results were obtained, except that the curing speed was somewhat slower.

EXAMPLE 13

99.5 grams of the monomer prepared in Example 1 were combined with 0.5 gram of a phenylhydrazine accelerator. In this instance, the monomer was not converted to the amine salt. This solution was found to be stable to heating at 82°C. for 2 hours or at 120°F. for 10 days. The second component was the same as in Example 9. A sheet of glass was coated with the second component by spraying from an aerosol can. After the solvent had evaporated, each sheet was coated with the monomer component, and the two sheets were then pressed together. The polymer set up within 15 minutes. After 24 hours, the sheets of glass could not be separated.

EXAMPLE 14

Example 13 was repeated, except that benzhydrazide was substituted for the phenylhydrazine. The results obtained were virtually identical.

Obviously, many modifications and variations of the present invention will occur to those skilled in the art, and it is intended to cover in the appended claims all such modifications and variations as fall within the true spirit and scope thereof.

I claim:

1. A monomer characterized by the formula:

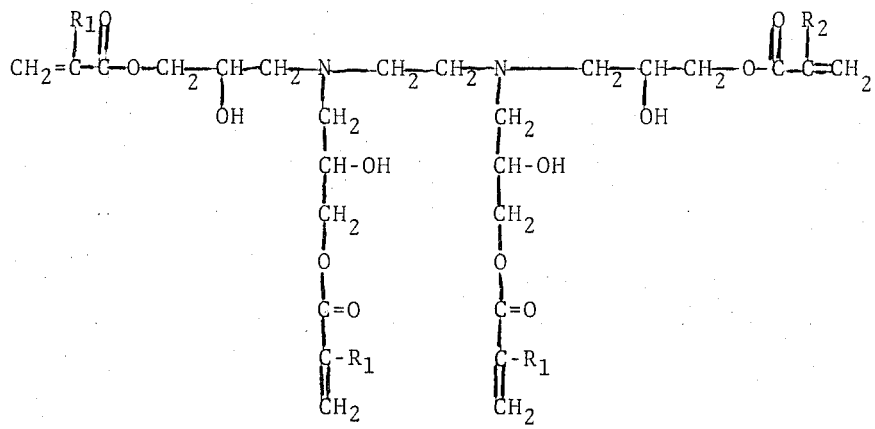

wherein $R_1$ and $R_2$ are selected from the group consisting of hydrogen and lower alkyl.

2. Monomers characterized by the formula:

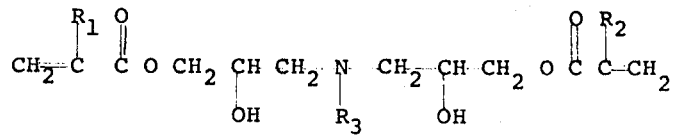

wherein $R_1$ and $R_2$ are selected from the group consisting of hydrogen and lower alkyl and $R_3$ is selected from the group consisting of lower alkyl and lower hydroxyalkyl.

3. A monomer characterized by the formula:
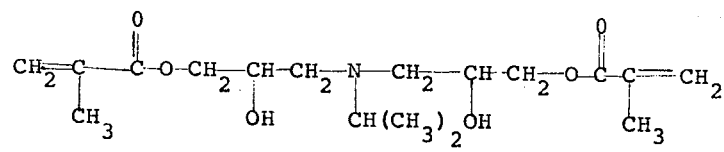
* * * * *